(12) United States Patent
Sawyer et al.

(10) Patent No.: US 6,544,083 B1
(45) Date of Patent: Apr. 8, 2003

(54) SHIFT MECHANISM FOR A MARINE PROPULSION SYSTEM

(75) Inventors: Kass W. Sawyer, Neenah, WI (US); Donald F. Harry, Appleton, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/090,202

(22) Filed: Mar. 4, 2002

(51) Int. Cl.[7] ............................................... B63H 23/08
(52) U.S. Cl. ............................. 440/75; 192/21; 192/51
(58) Field of Search ........................... 440/75; 192/21, 192/51

(56) References Cited

U.S. PATENT DOCUMENTS

| | | | |
|---|---|---|---|
| 4,223,773 A | 9/1980 | Croisant et al. | 192/48 |
| 4,412,826 A | 11/1983 | Jones et al. | 440/86 |
| 4,637,802 A | * 1/1987 | Taguchi et al. | 440/75 |
| 4,986,774 A | 1/1991 | Wantz | 440/75 |
| 5,051,102 A | * 9/1991 | Onoue | 440/75 |
| 5,059,144 A | 10/1991 | Onoue | 440/75 |
| 5,310,370 A | 5/1994 | Onoue | 440/75 |
| 5,788,546 A | 8/1998 | Ogino | 440/75 |
| 5,839,928 A | 11/1998 | Nakayasu et al. | 440/75 |
| 5,910,191 A | 6/1999 | Okamoto | 74/473 |
| 6,062,360 A | 5/2000 | Shields | 192/21 |

FOREIGN PATENT DOCUMENTS

JP          11-334694          * 12/1999

* cited by examiner

*Primary Examiner*—Sherman Basinger
(74) *Attorney, Agent, or Firm*—William D. Lanyi

(57) ABSTRACT

A gear shift mechanism is provided in which a cam structure comprises a protrusion that is shaped to extend into a channel formed in a cam follower structure. The cam follower structure can be provided with first and second channels that allow the protrusion of the cam to be extended into either which accommodates both port and starboard shifting mechanisms. The cam surface formed on the protrusion of the cam moves in contact with a selected cam follower surface formed in the selected one of two alternative channels to cause the cam follower to move axially and to cause a clutch member to engage with either a first or second drive gear.

19 Claims, 7 Drawing Sheets

SHIFT MECHANISM FOR A MARINE PROPULSION SYSTEM

BACKGROUND OF THE INVENTION

1. Field of the Invention

The present invention is generally related to a shift mechanism for a marine propulsion system and, more particularly, to a cam and cam follower arrangement which improves the efficiency of the shift mechanism and allows the arrangement of components to be reversed in order to accommodate a shift control mechanism on either the port or starboard side of the marine propulsion system.

2. Description of the Prior Art

Many different types of shift mechanisms are known to those skilled in the art for use in conjunction with marine propulsion systems, such as outboard motors or sterndrive systems.

U.S. Pat. No. 4,223,773, which issued to Croisant et al on Sep. 23, 1980, discloses a drive engaging apparatus. A clutch apparatus for a marine drive lower gear case includes a propeller shaft rotatably mounted in a gear case housing. A drive gear for both forward and reverse is positioned in the housing coaxial with the propeller shaft and a clutch member is rotatably fixed on the propeller shaft and moveable axially into drive engagement with the drive gear. Clutch engaging elements are provided on opposed portions of the drive gears and the clutch member. Shift means utilizing a positive acting cam means positively move the clutch member into and out of engagement from the drive gears. The shift means also include a releasable latch means to positively maintain the shift means in the engaged position and a preloading means between the shift means and the clutch member to snap the clutch member into engagement.

U.S. Pat. No. 6,062,360, which issued to Shields on May 16, 2000, discloses a synchronizer for a gear shift mechanism for a marine propulsion system. A synchronized gear shift mechanism is provided for a marine propulsion system. Using a hub and a sleeve that are axially moveable relative to an output shaft but rotationally fixed to the shaft and to each other, the gear shift mechanism uses associated friction surfaces to bring the output shaft up to a speed that is in synchronism with the selected forward or reverse gear prior to mating associated gear tooth surfaces together to transmit torque from an input shaft to an output shaft. The friction surfaces on the forward and reverse gears can be replaceable to facilitate repair after the friction surfaces experience wear.

U.S. Pat. No. 4,986,774, which issued to Wantz on Jan. 22, 1991, discloses a desmodromic shift adaptor for a counter-rotating propeller shaft assembly. An adaptor member is described for accommodating the use of a desmodromic cam-actuated shifting mechanism into a conventional propeller shaft cavity formed in the lower end of the gearcase of a marine propulsion system, wherein forward thrust on the propeller shaft is transferred to the gearcase at a point aft of the forward and reverse gears mounted about the propeller shaft. The adaptor member includes a cup, which is adapted to mount the fore one of the forward and reverse gears through a bearing member. The adaptor member further includes an internal passage within which is disposed the movable cam of the shifting mechanism, and an opening is in communication with the passage for allowing connection of the shift shaft to the shifting cam after assembly of the adaptor member into the gearcase cavity.

U.S. Pat. No. 5,788,546, which issued to Ogino on Aug. 4, 1998, describes a shift assistor for a marine transmission. A transmission for a dual, counter-rotational propeller system incorporates a shift assistor to yieldably cushion transmission engagement. The shift assistor desirably operates between one clutch of a dual clutch assembly and a clutch actuator. The shift assistor specifically yieldably couples the clutch to the actuator. The yieldably coupling permits relative movement between the shift assistor and the clutch during the shifting operation in order to allow the clutches to engage the corresponding gears separately. The shift assistor thus reduces coupling shock when shifting the transmission either into a forward or a reverse drive condition.

U.S. Pat. No. 5,910,191, which issued to Okamoto on Jun. 8, 1999, describes a shifting mechanism for an outboard motor. An engine of an outboard motor includes an improved engine component layout to minimize the size of the engine and to generally isolate a shift position mechanism from an intake air flow into the engine. The outboard motor includes a shifting mechanism that shifts a transmission between three operational states: forward, neutral, and reverse. The shifting position mechanism is principally positioned directly beneath a flywheel of the engine. The position simplifies the design of the shifting mechanism and reduces the girth of the engine and associated components within the cowling.

U.S. Pat. No. 5,059,144, which issued to Onoue on Oct. 22, 1991, describes an ahead/astern shifting device for a marine propulsion unit. A shift arrangement for a marine outboard drive that permits a forward positioning of the drive shaft without interfering with the operation of the shifting mechanism is disclosed.

U.S. Pat. No. 4,412,826, which issued to Jones et al on Nov. 1, 1983, describes a safety shift device for an outboard motor. A device is disclosed for attachment to the gear shift lever of an outboard motor to enable shifting the gears from neutral to forward and/or reverse at a safe distance inboard of the motor.

U.S. Pat. No. 5,310,370, which issued to Onoue on May 10, 1994, describes a thrust supporting structure for a marine propulsion unit. A thrust taking arrangement for a marine propulsion unit that employs a propeller shaft and a thrust transfer member that is affixed against an abutment on the propeller shaft and which transfers thrust to a lower unit housing through forward and reverse thrust bearings. In one embodiment, the thrust transfer member is permanently affixed to the propeller shaft and in the other embodiments, it is detachably connected by threaded connections.

U.S. Pat. No. 5,839,928, which issued to Nakayasu et al on Nov. 24, 1998, describes a shifting mechanism for an outboard drive. A shifting mechanism for an outboard drive of a watercraft provides reduced coupling shock when the forward gears are engaged by a dual clutch assembly, as well as provides for consistent and quick engagement of the clutch assembly with the gear. The shifting mechanism involves a first gear and a corresponding first clutch, and a second gear and a corresponding second clutch. A plunger carries the first and second clutches which are arranged on the plunger at unequal distances from their respective gears. This nonuniform spatial relationship between the clutches and gears causes one clutch to engage its corresponding gear before the other clutch engages its corresponding gear. The staggered engagement decreases shock on the transmission and permits quicker engagement between the clutches and gears.

The patents described above are hereby expressly incorporated by reference in the description of the present invention.

The patents described above illustrate many different versions of gear shift mechanisms and apparatus for use in a marine propulsion system. For example, U.S. Pat. No. 4,223,773 discloses a desmodromic actuator mechanism to move a clutch member axially in a direction parallel to a propeller shaft axis and into and out of engagement with forward and reverse gears. U.S. Pat. No. 5,910,191 shows the general arrangement of the shift mechanism in relation to other structures in the outboard motor. U.S. Pat. No. 5,059,144 shows one possible configuration of a cam and cam follower arrangement for a shift mechanism of an outboard motor. U.S. Pat. No. 4,412,826 shows the general configuration of a shift lever on the starboard side of an outboard motor cowl.

SUMMARY OF THE INVENTION

A shift mechanism for a marine propulsion system, made in accordance with the preferred embodiment of the present invention, comprises an output shaft which is rotatable about a first axis and a first drive gear which is rotatable about the first axis and also rotatable relative to the output shaft. A clutch member is rotatable with the output shaft about the first axis and is movable relative to the output shaft in a direction parallel to the first axis. An actuator is attached to the clutch member for axial and rotational movement in synchrony with the clutch member. A cam, which is rotatable about a second axis, is shaped to have a protrusion extending in a direction away from the second axis. The cam has a cam surface proximate a distal end of the protrusion. A cam follower is attached to the actuator. A first channel is formed in the cam follower and is generally perpendicular to the first axis. The channel extends between a first pair of cam follower surfaces in a first direction away from the first axis. The protrusion extends into the first channel and between the first pair of cam follower surfaces. The actuator is movable in an axial direction in response to rotation of the cam about the second axis.

In a preferred embodiment of the present invention, a second channel is formed in the cam follower and is generally perpendicular to the first axis. It extends between a second pair of cam follower surfaces in a second direction away from the second axis. The second direction is generally opposite and parallel to the first direction. The protrusion is alternatively disposable into the first and second channels and between the first and second pairs of cam follower surfaces.

The actuator and the cam follower are rotatable relative to each other and movable in synchrony with each other in a direction parallel to the first axis in a preferred embodiment of the present invention. The first drive gear can be a forward gear or a reverse gear. A second drive gear, which is rotatable about the first axis and rotatable relative to the output shaft, can also be provided in which the clutch member is alternately movable relative to the output shaft in a direction parallel to the first axis and into driving relation with the first or second drive gears.

The output shaft can be a propeller shaft and the marine propulsion system can be an outboard motor. The protrusion of the cam can comprise a generally spherical cam surface or, alternatively, the cam surface can be shaped to conform to an involute surface. Other shapes of the cam surface are also compatible with the concepts of the present invention.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
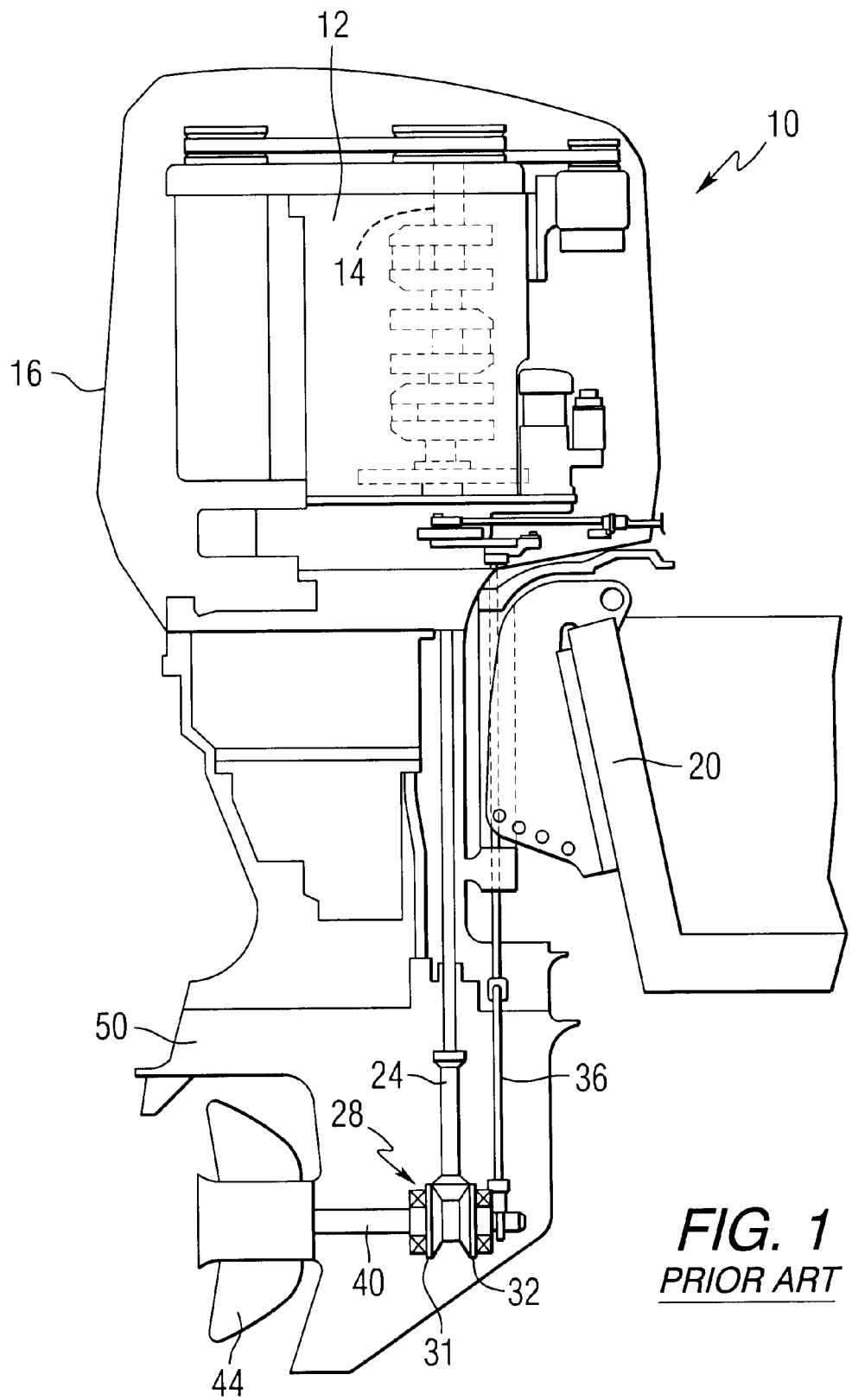
FIG. 1 shows an outboard motor known to those skilled in the art.

Throughout the description of the preferred embodiment of the present invention, like components will be identified by like reference numerals.

FIG. 1 shows a known type of outboard motor 10. An internal combustion engine 12, comprising a crankshaft 14, is housed within a cowl 16. The outboard motor 10 is attachable to a transom 20 of a marine vessel. A driveshaft 24 is suspended from the internal combustion engine 12 and connected in torque transmitting relation with the crankcase 14. A transmission 28 connects the driveshaft 24 in torque transmitting relation with first and second drive gears, 31 and 32, respectively. In a manner which will be described in greater detail below, a shift shaft 36 is operatively connected to a mechanism which causes a clutch to assume one of three possible positions. These alternative positions either connect the driveshaft 24 to the first drive gear 31, the second drive gear 32, or neither of the two drive gears. In this way, an output shaft 40, or propeller shaft, is connected in torque transmitting relation with the driveshaft 24 to cause the propeller shaft 40 to rotate in either a clockwise or counterclockwise direction. A propeller 44 is shown attached to the propeller shaft. The lower portion 50 of the outboard motor 10 will be described in greater detail below in conjunction with FIG. 2. The lower portion 50 contains the gearcase in which the transmission 28 is supported and housed.

Figure 2:
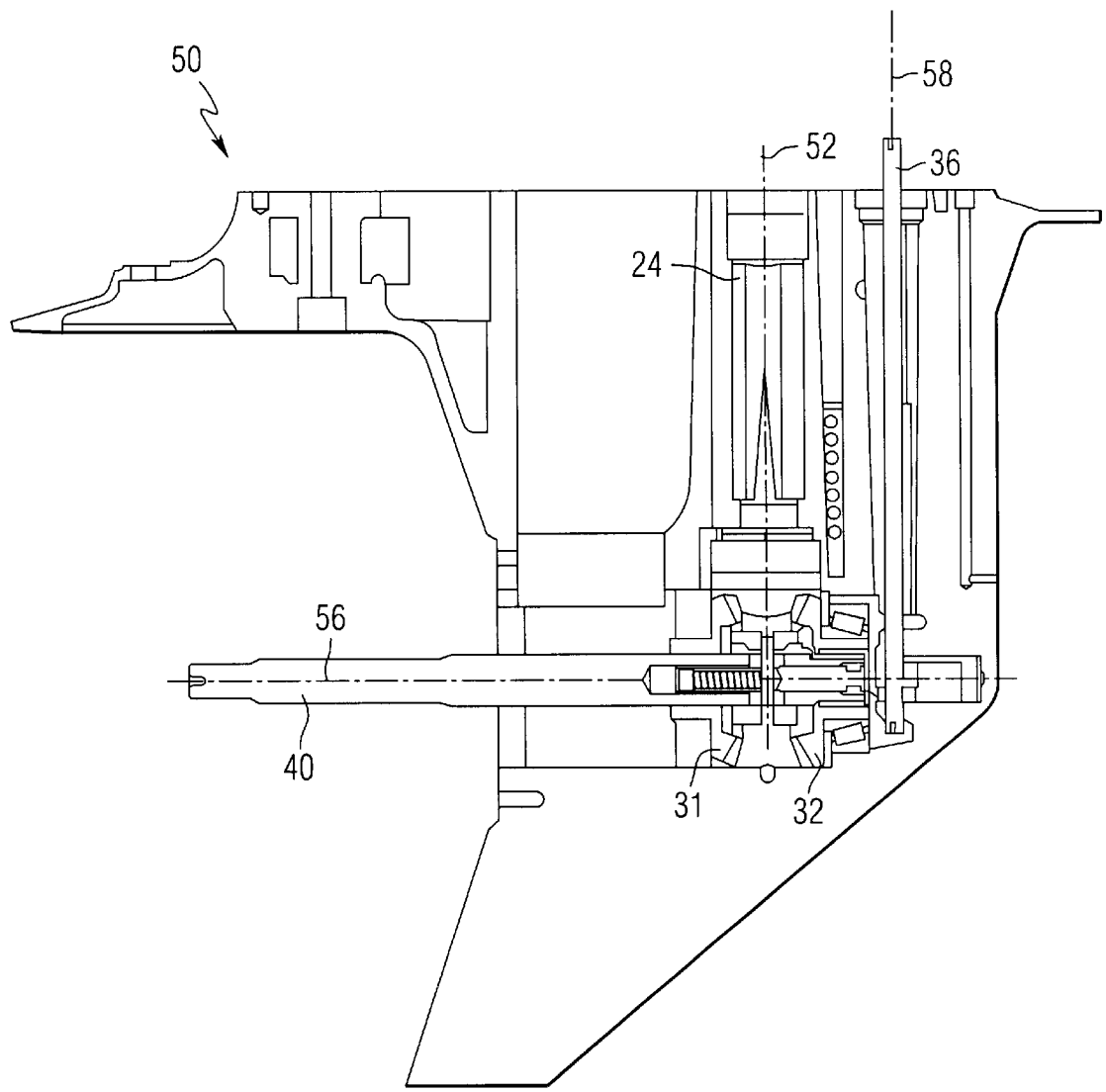
FIG. 2 shows the lower portion of an outboard motor.

FIG. 2 shows the lower portion 50 of the outboard motor 10 with the driveshaft 24 supported for rotation about a driveshaft axis 52 and the propeller shaft, or output shaft 40 supported for rotation about a first axis 56. The shift shaft 36 is rotatable about a second axis 58. The first and second drive gears, 31 and 32, are rotatable about the first axis 56 and disposed in torque transmitting relation with a bevel gear attached to the bottom end of the driveshaft 24 and disposed in gear tooth meshing relation with the first and second drive gears, 31 and 32. Rotation of the shift shaft 36 about the second axis 58 causes a clutch member to move axially in a direction parallel to the first axis 56. This axial movement of the clutch member allows the clutch member to assume one of three alternative positions, as described above. These three positions include a neutral position, a position in which the clutch member is engaged with the first drive gear 31, and a position in which the clutch member is engaged with the second drive gear 32. Several different types of mechanisms are known to those skilled in the art for use in causing the desired axial movement of the clutch member, in a direction which is parallel to the first axis, in response to rotation of the shift shaft 36 about the second axis 58. These known types of mechanisms will be described below in conjunction with FIGS. 3–5.

Figure 3:
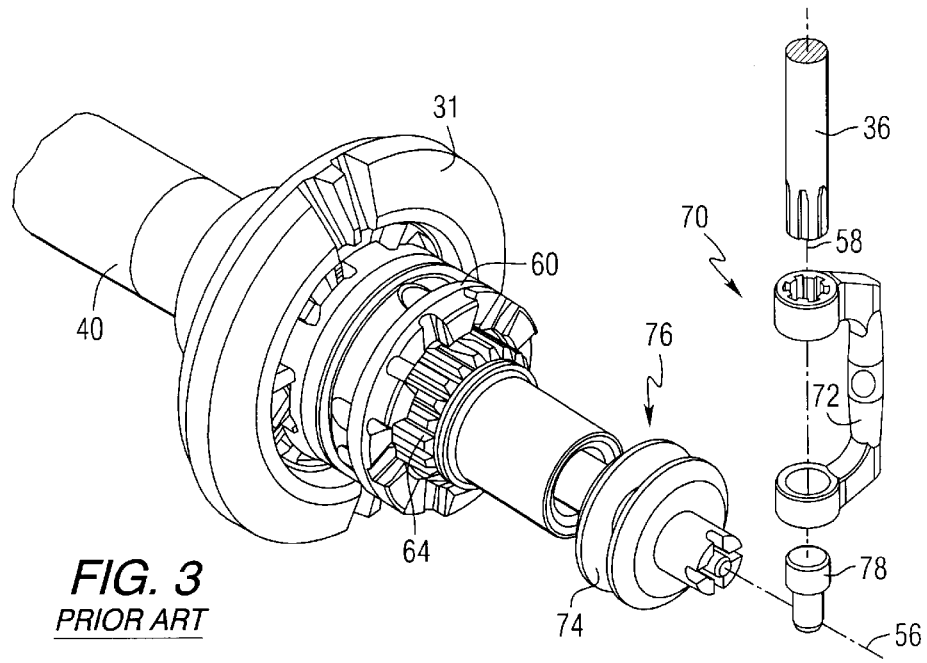
FIGS. 3–5 show prior art shift mechanisms.

FIG. 3 illustrates a known type of bell crank and spool shift mechanism. The exploded isometric view shows a first drive gear 31 which is rotatable about the first axis 56 of the output shaft 40, which is a propeller shaft. The clutch member 60 is rotatable with the output shaft 40 about the first axis 56 and is movable relative to the output shaft 40 in a direction parallel to the first axis 56. The male splines 64, which are attached to the output shaft 40, are associated with female splines formed in the internal surface of the clutch member 60. A generally U-shaped crank member 70 has a rod portion 72 shaped to be received in a groove portion 74 of a spool follower component 76 which operates as an actuator to cause the clutch member 60 to move axially in a direction parallel to the first axis 56. A support member 78 cooperates with the U-shaped crank member element 70 and the shift shaft 36 to cause rotation of the U-shaped crank member 70 about the second axis 58 which, in turn, causes the spool follower 76 to move in an axial direction parallel to the first axis 56.

Figure 4:
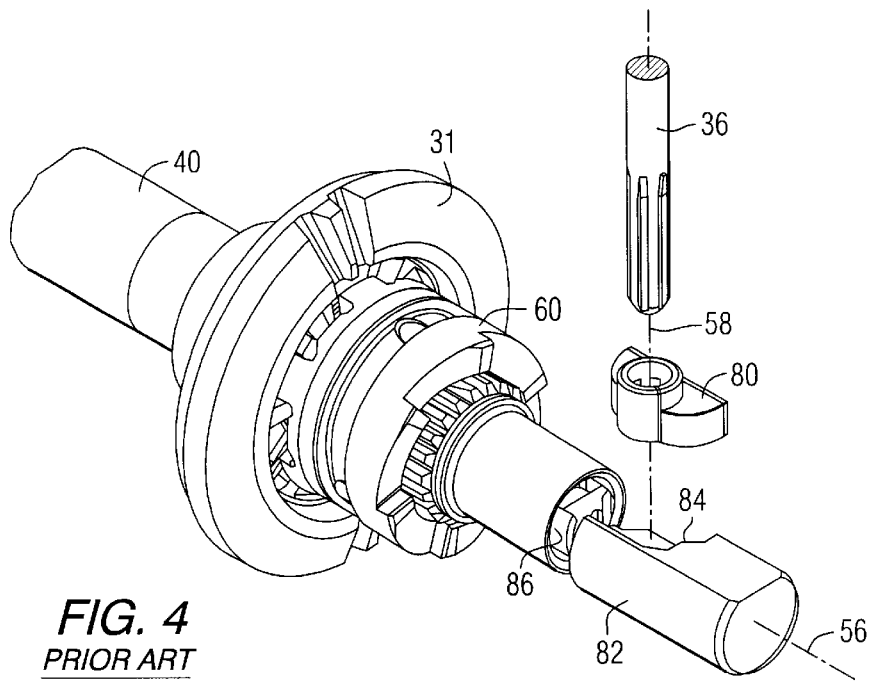

The shift mechanism shown in FIG. 4 is a desmodromic shift mechanism similar to that described in U.S. Pat. No. 4,223,773. A cam 80 is rotatable about the second axis 58 in response to rotation of the shift shaft 36. A cam follower 82 has a cam surface 84 formed in it. The cam follower 82 is connected to an actuator 86 which, in turn, is connected to the clutch member 60 to cause the clutch member to move in an axial direction generally parallel to the first axis 56.

Figure 5:
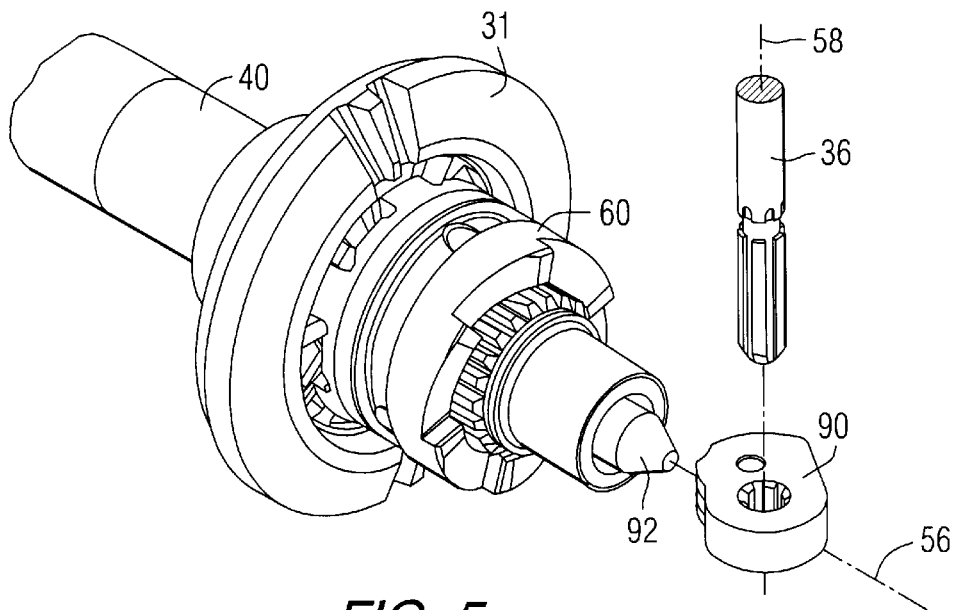

FIG. 5 is an exploded isometric view of a typical cam and follower shift system that is generally known to those skilled in the art. A cam 90 is attachable to a shift shaft 36 for rotation about the second axis 58 and a cam follower 92 is associated with an actuator that is, in turn, connected to the clutch mechanism 60 to cause the clutch mechanism to move axially in a direction parallel to the first axis 56 in response to rotation of the cam 90 about the second axis 58.

Figure 6:
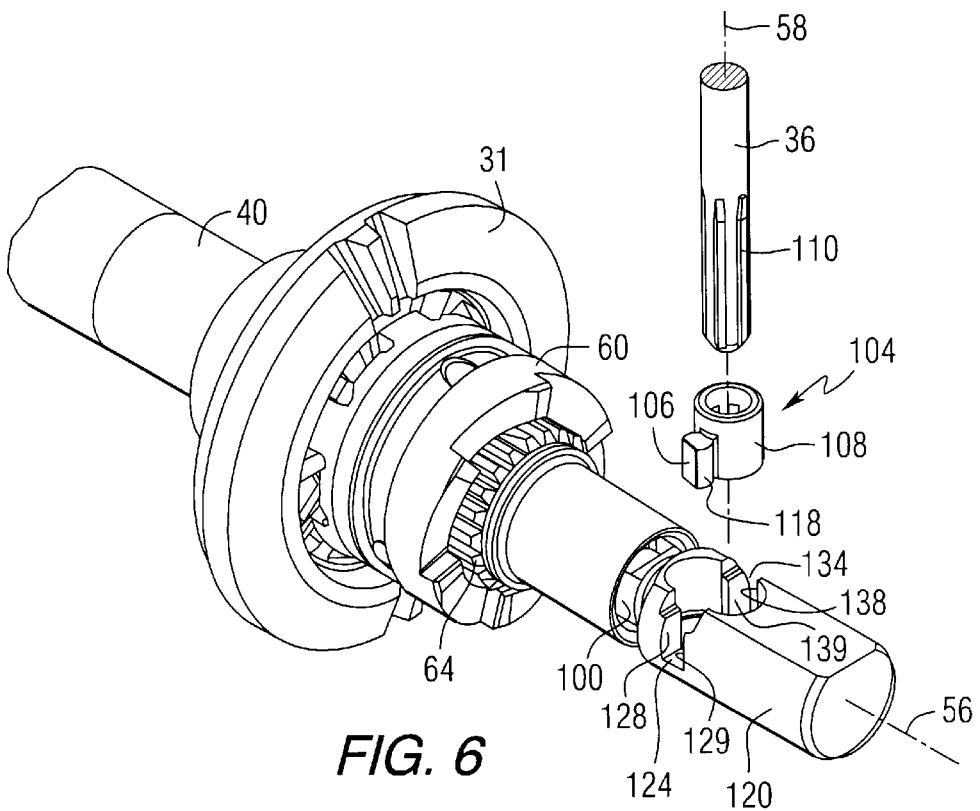
FIG. 6 is an isometric view of the present invention.

FIG. 6 is an exploded isometric view of the shift mechanism of the present invention. Some of the components shown in FIG. 6 are generally similar to components shown in FIGS. 3–5. The output shaft 40 is rotatable about the first axis 56. The output shaft 40 is typically a propeller shaft in many embodiments of the present invention. The first drive gear 31 is rotatable about the first axis 56 and rotatable relative to the output shaft 40. In other words, if the clutch member 60 is not engaged with the first drive gear 31, the output shaft 40 does not rotate in synchrony with the first drive gear 31. It should also be understood that a second drive gear 32, as described above, would typically be included in the assembly of FIG. 6, but has been removed for purposes of clarity and ease of illustration. The clutch member 60 is rotatable with the output shaft 40 about the first axis 56 and is movable relative to the output shaft in a direction parallel to the first axis 56. In other words, the clutch member 60 can move relative to the male spline members 64 in an axial direction, but is rotatably fixed to the output shaft 40 because of the interaction of the male spline members 64 and female members formed on the internal surface of the clutch member 60. An actuator 100 is attached to the clutch member 60 for axial and rotational movement in synchrony with the clutch member 60. The connection between these components is provided by a pin which will be described in greater detail below. A cam 104 is rotatable about the second axis 58 and connectable, by an appropriate spline connection, to the shift shaft 36. The cam is shaped to have a protrusion 106 which extends in a direction away from the second axis 58 as shown in FIG. 6. The barrel portion 108 of the cam 104 is provided with internal spline teeth that are shaped to receive the splined end 110 of the shift shaft 36. The cam 104 has a cam surface 118 proximate a distal end of the protrusion 106.

With continued reference to FIG. 6, a cam follower 120 is attached to the actuator 100. A first channel 124 is formed in the cam follower 120. The first channel 124 is generally perpendicular to the first axis 56 and extends between a first pair of cam follower surfaces in a first direction away from the first axis 56. Cam follower surfaces 128 and 129 are the first pair of cam follower surfaces which define the first channel 124.

A second channel 134 is formed in the cam follower 120 and comprises cam follower surfaces 138 and 139 which are defined herein as the second pair of cam follower surfaces. The second channel 134 is generally perpendicular to the first axis 56 and extends between the second pair of cam follower surfaces in a second direction away from the second axis 56. The second direction is generally opposite and parallel to the first direction described above in relation to the first channel 124. The protrusion 106 is alternatively disposable into the first and second channels, 124 and 134, and between the first and second pairs of cam follower surfaces. This interchangeability of the alternative positions of the cam 104 allows the present invention to be used in conjunction with outboard motors or other marine propulsion systems in which the gear shift mechanism is on either the port or starboard side of the marine propulsion system. This also accommodates the interchanging of the first and second gears, 31 and 32, which typically serve as the reverse and forward gears, respectively. The actuator 100 is movable in an axial direction parallel to the first axis 56 in response to rotation of the cam 104 about the second axis 58.

Figure 7:
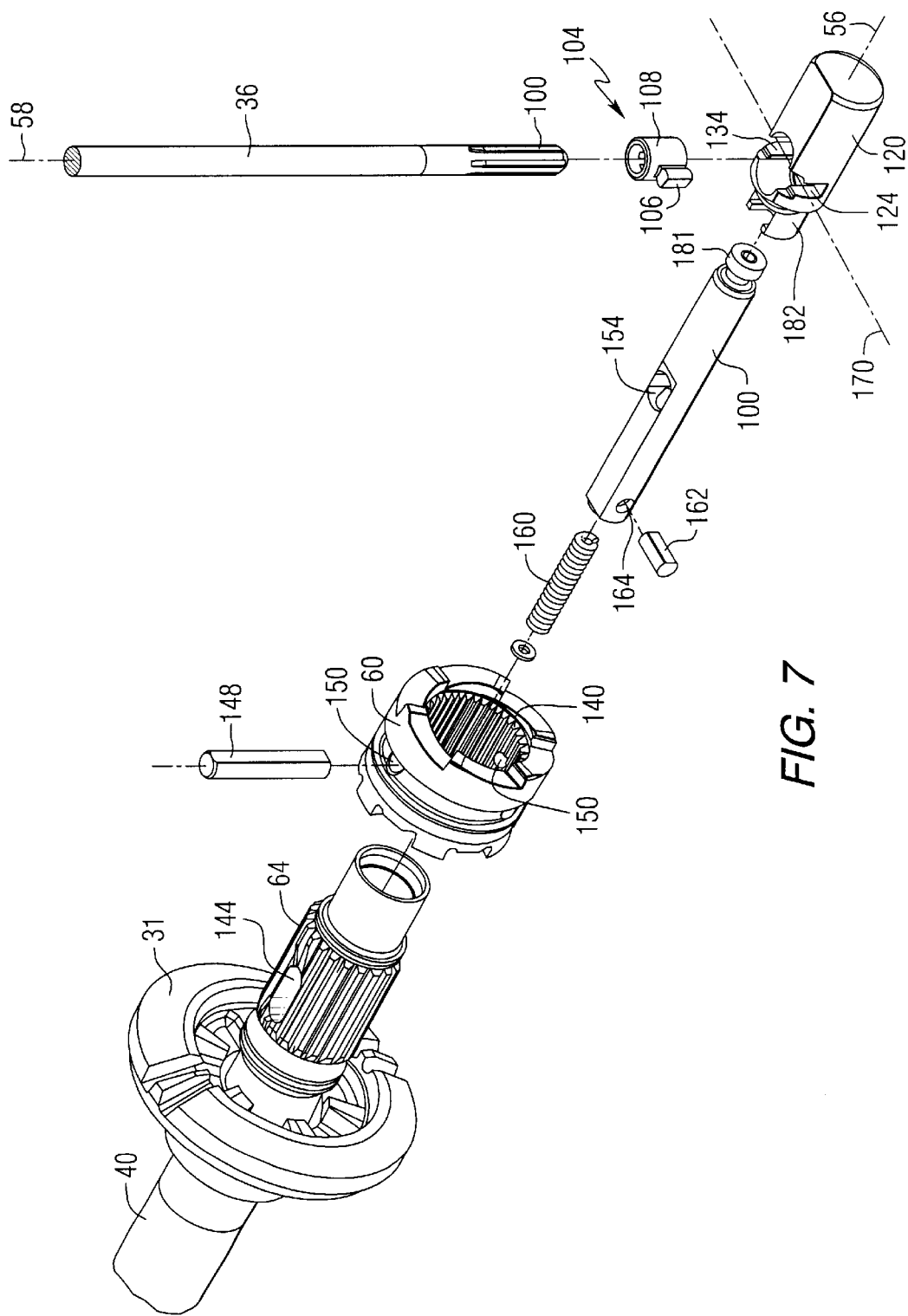
FIG. 7 is an exploded isometric view of the present invention.

FIG. 7 is an isometric exploded view of the present invention. The first drive gear 31 is shown in relation to the output shaft 40, which is a propeller shaft in a preferred embodiment of the present invention. A portion of the output shaft 40 is provided with male spline teeth 64 which are shaped to be engaged with the female spline teeth 140 formed in the internal surface of the clutch member 60. An elongated hole 144 is formed radially through the output shaft 40 to receive a pin 148 that also extends through a pair of holes 150 formed in the clutch member 60 and through the hole 154 formed in the actuator 100. This locks the clutch member 60 to the actuator 100 while the elongated hole 144 allows axial movement of the clutch member 80 and actuator 100 relative to the output shaft 40. In a manner generally known to those skilled in the art, a spring 160 is disposed within a hollow cavity of the actuator 100 and held in place by a pin 162 which is shaped to be received in a hole 164 formed in the actuator 100. The cam follower 120 is provided with the first channel 124 and the second channel 134 which extend in first and second directions, respectively, along line 170 which is generally perpendicular to the first axis 56. In a manner which is generally known to those skilled in the art, the cam follower 120 is attachable to the actuator 100, by mating components 181 and 182, to allow the actuator 100 to rotate with the clutch member 60 and relative to the cam follower 120, which is not intended to rotate about the first axis 56. These same components connect the actuator 100 to the cam follower 120 in such a way that they move axially in synchrony with each other in a direction parallel to the first axis 56.

With continued reference to FIG. 7, the cam 104 is received in the opening formed in the cam follower 120 with the protrusion 106 extending either into the first channel 124 or the second channel 134. Depending on the gear selection actuator of the associated marine propulsion system, the protrusion 106 can be inserted into either of the two channels, 124 and 134, to suit either a port side actuator or a starboard side actuator. The spline teeth 100 of the shift shaft 36 is shaped to be received in the internal spline teeth of the barrel portion 108 of the cam 104.

Figure 8:
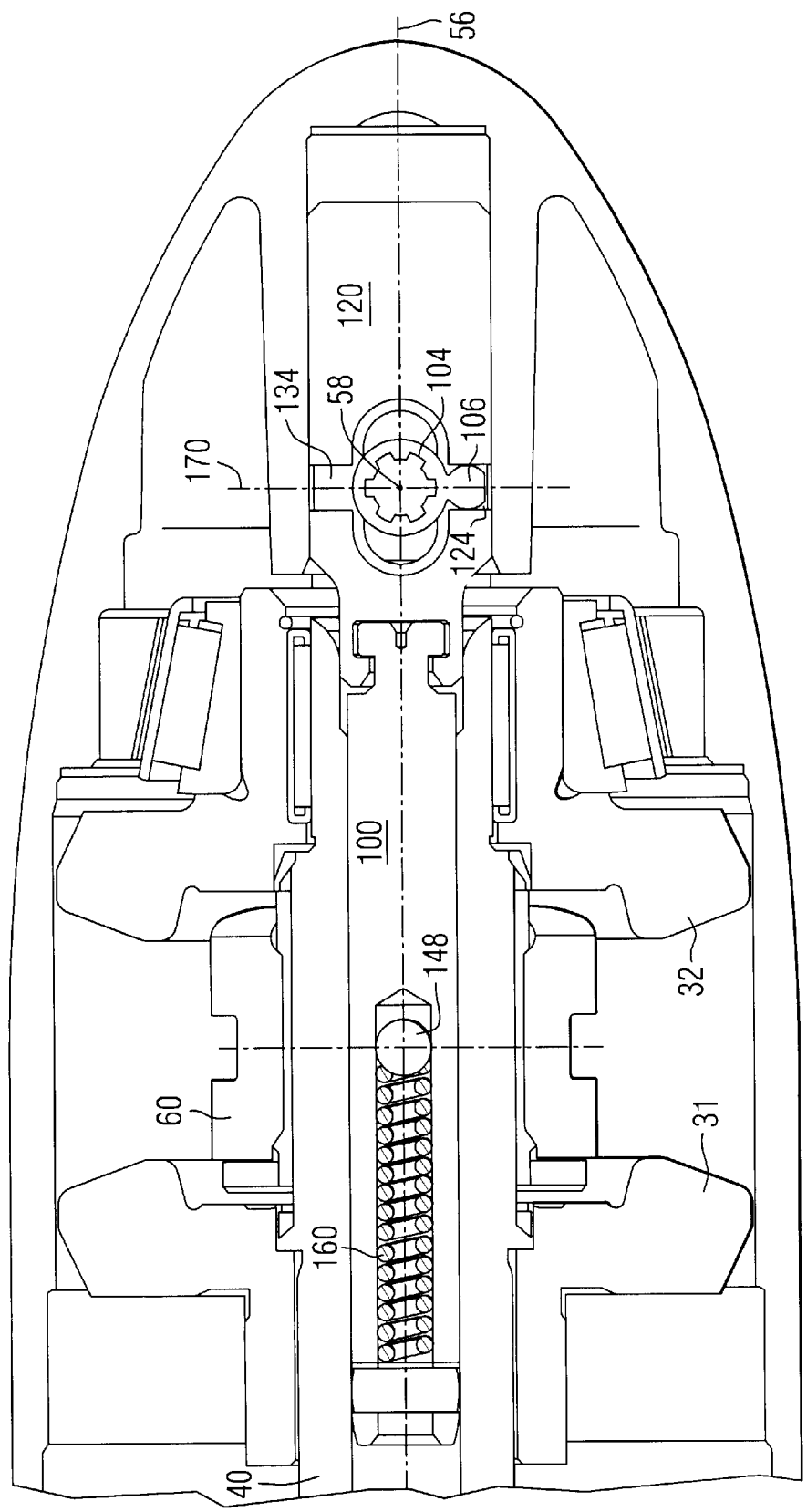
FIG. 8 is a section view of a gearcase showing the present invention.

FIG. 8 is a section view through the gearcase of an outboard motor, such as those shown in FIGS. 1 and 2. The first and second drive gears, 31 and 32, are independently rotatable about the first axis 56. A bevel gear attached to the driveshaft 24, as described above in FIG. 1, is disposed in gear mesh relation with both the first and second drive gears, 31 and 32. As a result of rotation of the driveshaft 24, the first and second drive gears continuously rotate in opposite directions about the first axis 56. Depending on which of the two drive gears, 31 and 32, are connected in driving relation with the clutch member 60, the directional rotation of the output shaft 40 about the first axis 56 is determined. As an example, if the clutch member 60 is moved toward the left in FIG. 8 and into engagement with the first drive gear 31, the output shaft 40 will rotate in synchrony with the output shaft 40 and the clutch member 60. Conversely, if the clutch member 60 is moved toward the right in FIG. 8 and into engagement with the second drive gear 32, the output shaft 40 will move in synchrony with the clutch member 60 and the second drive gear 32. This relationship, using a dog clutch and three bevel gears, is well known to those skilled in the art. The pin 148 rigidly attaches the actuator 100 to the clutch member 60 and causes the clutch member to move in synchrony with the actuator 100 in response to the axial movement of the cam follower 120 in a direction parallel to the first axis 56. This axial movement of the cam follower 120, in turn, is in response to rotation of the cam 104 about the second axis 58. The rotation of the cam 104 causes the protrusion 106 to rotate about the second axis 58 and the resulting interaction between the cam surface of the protrusion 106 and the first pair of cam follower surfaces, as described above in conjunction with FIG. 6, causes the cam follower 120 to move axially in a direction parallel to the first axis 56. The first and second channels, 124 and 134, extend in opposite directions along line 170 which is generally perpendicular to the first axis 56.

Figure 9A:
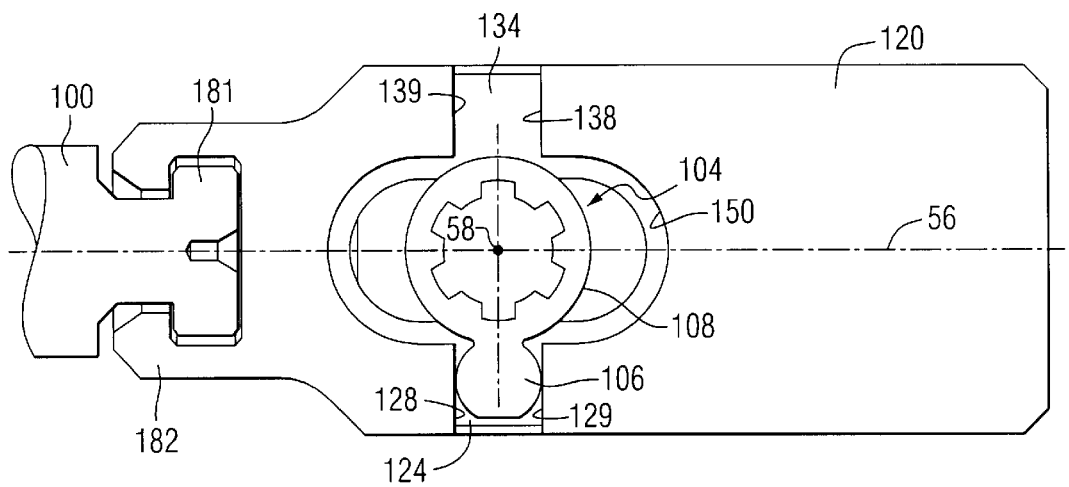
FIGS. 9A and 9B show alternative configurations of the present invention.
Figure 9B:
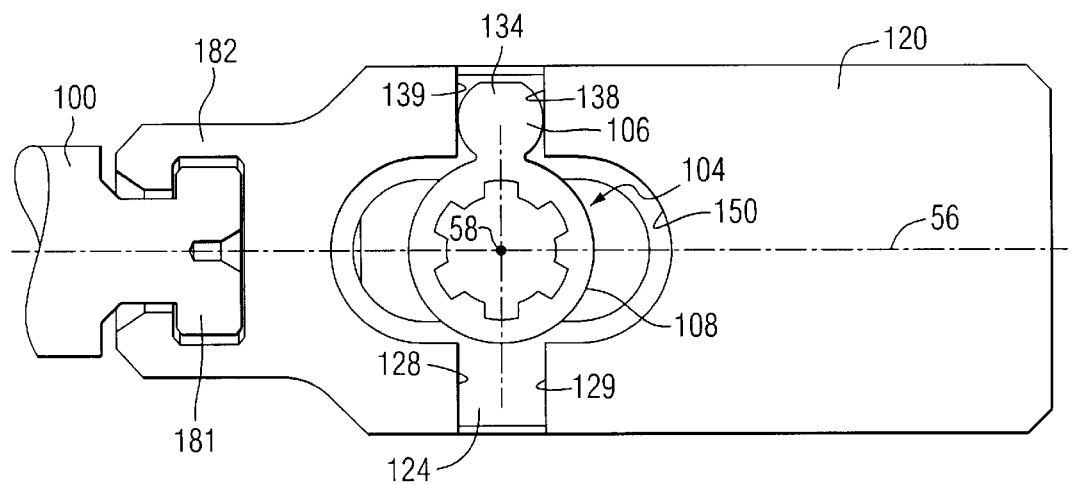

FIGS. 9A and 9B show the relationship between the cam 104 and the cam follower 120 in greater detail. FIG. 9A shows the protrusion 106 extending into the first channel 124 between cam surfaces 128 and 129. If the cam 104 rotates in a clockwise direction about the second axis 58, the cam surface will push against cam follower surface 128 and cause the cam follower 120 to move in an axial direction toward the left in FIG. 9A. In FIG. 9B, the protrusion 106 is alternatively positioned in the second channel 134 between cam follower surfaces 139 and 138. If the cam 104 is rotated clockwise, the cam surface will push against cam follower surface 138 and cause the cam follower 120 to move in a direction toward the right in FIG. 9B.

Comparing FIGS. 9A and 9B, it can be seen that these two arrangements allow a clockwise rotation of the cam 104 to have opposite effects on the cam follower 120. This selection of cam position is determined by the desired location of the shift actuator on the marine propulsion system, such as the outboard motor, wherein the shift actuator can be placed on the port or starboard sides of the outboard motor to suit either particular application. No additional parts are required for this flexibility in the arrangement. During assembly of the shift mechanism, the protrusion 106 is merely placed in the desired one of the two channels, 124 and 134.

With continued reference to FIGS. 9A and 9B, it can be seen that an elongated hole 150 is formed in the cam follower 120 to allow the cam follower to move axially in a direction parallel to the first axis 56 while the cam barrel 108 remains stationary along with the shift shaft 36. In FIGS. 9A and 9B, the cam surface on the protrusion 106 is illustrated as being generally circular or spherical. It should be understood that alternative configurations of the cam surface are also within the scope of the present invention. Similarly, the cam follower surfaces, 128, 129, 138, and 139, are illustrated as being generally planer surfaces formed in the cam follower 120. These surfaces need not be perfectly planer, or flat, and they need not be parallel to each other. In other words, cam follower surfaces 128 and 129 need not be parallel to each other although they are illustrated that way in the Figures. Similarly, cam follower surfaces 138 and 139 need not be parallel to each other.

Of the various types of gear shift mechanisms known to those skilled in the art and described above in conjunction with FIGS. 3–5, each has certain advantages and disadvantages. For example, the cam and follower arrangement shown in FIG. 5 is generally low cost and a simple design that is relatively easy to assembly. The port and starboard linkage alternative can be accommodated by assembling the cam 90 either as shown in FIG. 5 or turned upside down relative to the shift shaft 36. The mechanism shown in FIG. 5 has the disadvantages of relative high frictional forces between the cam 90 and the cam follower 92 and a high pressure angle between the cam and cam follower which is caused by space limitations in the gearcase and relatively small angular rotation capability of the shift shaft 36. When shifting the mechanism out of reverse gear, a spring is usually required to disengage the reverse gear. This spring load adds to the shift load when shifting out of forward gear.

The bell and spool shift system shown in FIG. 3 has the advantages of relatively low frictional forces between the crank 70 and the spool follower 76 and this reduces shifting forces. The port and starboard shift linkage can be accommodated by simply assembling the crank 70 on an opposite side of the gearcase housing. No spring is required to disengage reverse gear and, therefore, this eliminates a spring that would otherwise add to the shift load when shifting out of forward gear. However, the bell crank and spool shift system has the disadvantages of being more complicated to assemble than the cam and follower system shown in FIG. 5 and being larger in comparison to the cam and follower system or the desmodromic system illustrated in FIG. 4.

The desmodromic shift system shown in FIG. 4 has the advantages of not requiring a spring to disengage reverse gear and, therefore, the elimination of the spring avoids the addition to the shift load when shifting out of forward gear. Also, the desmodromic is relatively small in size compared to the cam and follower system of FIG. 5. Furthermore, the desmodromic shift system has a relatively short lever arm and this increases mechanical advantage and helps to counteract the effect of the high pressure angle between the cam 80 and the cam follower 82. The desmodromic system of FIG. 4 has the disadvantages of being more complicated to assemble than the cam and follower system and having higher frictional forces between the cam 80 and the cam follower 82. Also, high pressure angles between the cam and cam follower in the desmodromic system of FIG. 4 are caused by the smaller cam 80. Furthermore, the desmodromic system has a relatively low efficiency in comparison to the bell crank and follower systems.

With reference to FIGS. 6 and 7, one advantage of the present invention is that the curvature of the cam surface 118 on the protrusion 106 at the contact point with the associated cam follower surface allows a generally rolling motion instead of a purely sliding motion between the cam and the cam follower surface. This rolling motion, along with the relatively short lever arm of the protrusion, yields a highly efficient shift mechanism with a high mechanical advantage in comparison to the alternative shift mechanisms normally used in marine propulsion systems. Furthermore, the present invention eliminates most of the disadvantages of the three known shift mechanisms illustrated in FIGS. 3–5. The advantageous characteristics of the present invention include its small size in comparison to the cam and follower system in FIG. 5 and the fact that a simple reversal of the cam 104 allows both port and starboard shift linkages to be easily accommodated without the necessity of additional components to be manufactured for these specific purposes. Simply rotating the cam 104 so that the protrusion 106 extends into the desired one of the first and second channels accommodates either port or starboard shift linkage systems. The present invention exhibits low frictional forces between the cam surface of the protrusion 106 and the cam follower surface in the channels of the cam follower 120. That lower frictional force reduces the required shift force. No spring is required to disengage the reverse gear. Therefore, the present invention eliminates the spring that would add to the shift load when shifting out of forward gear. The present invention also provides a relatively short lever which increases the mechanical advantage of the system and helps to counteract the effects of high pressure angle between the cam surface and the cam follower surface. Empirical tests have confirmed that the required force needed to move a control handle of the shift lever is generally lower when the present invention is used than either of the three prior art systems described above in conjunction with FIGS. 3–5.

Although the present invention has been described in particular detail and illustrated to show a preferred embodiment, it should be understood that alternative embodiments are also within its scope.

We claim:

1. A shift mechanism for a marine propulsion system, comprising:

an output shaft rotatable about a first axis;

a first drive gear which is rotatable about said first axis and rotatable relative to said output shaft;

a clutch member which is rotatable with said output shaft about said first axis, said clutch member being movable relative to said output shaft in a direction parallel to said first axis;

an actuator attached to said clutch member for axial and rotational movement in synchrony with said clutch member;

a cam which is rotatable about a second axis, said cam being shaped to have a protrusion extending in a direction away from said second axis, said cam having a cam surface proximate a distal end of said protrusion;

a cam follower attached to said actuator;

a first channel formed in said cam follower, said first channel being generally perpendicular to said first axis and extending between a first pair of cam follower surfaces in a first direction away from said first axis, said protrusion extending into said first channel and between said first pair of cam follower surfaces, said actuator being movable in an axial direction in response to rotation of said cam about said second axis; and a second channel formed in said cam follower, said second channel being generally perpendicular to said first axis and extending between a second pair of cam follower surfaces in a second direction away from said second axis, said second direction being opposite and parallel to said first direction, said protrusion being alternatively disposable into said first and second channels and between said first and second pairs of cam follower surfaces.

2. The shift mechanism of claim 1, wherein:

said actuator and said cam follower are rotatable relative to each other and movable in synchrony with each other in a direction parallel to said first axis.

3. The shift mechanism of claim 1, wherein:

said first drive gear is a forward gear.

4. The shift mechanism of claim 1, wherein:

said first drive gear is a reverse gear.

5. The shift mechanism of claim 1, wherein:

said output shaft is a propeller shaft.

6. The shift mechanism of claim 1, further comprising:

a second drive gear which is rotatable about said first axis and rotatable relative to said output shaft, said clutch member being alternately movable relative to said output shaft in a direction parallel to said first axis and into driving relation with said first and second drive gears.

7. The shift mechanism of claim 1, wherein:

said marine propulsion system is an outboard motor.

8. The shift mechanism of claim 1, wherein:

said protrusion comprising a generally spherical cam surface.

9. The shift mechanism of claim 1, wherein:

said clutch member is movable relative to said output shaft in a direction parallel to said first axis in response to rotation of said cam about said second axis.

10. A shift mechanism for a marine propulsion system, comprising:

an output shaft rotatable about a first axis;

a first drive gear which is rotatable about said first axis and rotatable relative to said output shaft;

a clutch member which is rotatable with said output shaft about said first axis, said clutch member being movable relative to said output shaft in a direction parallel to said first axis;

an actuator attached to said clutch member for axial and rotational movement in synchrony with said clutch member;

a cam which is rotatable about a second axis, said cam being shaped to have a protrusion extending in a direction away from said second axis, said cam having a cam surface proximate a distal end of said protrusion;

a cam follower rotatably attached to said actuator for movement in synchrony with said actuator in a direction which is generally parallel to said first axis;

a first channel formed in said cam follower, said first channel being generally perpendicular to said first axis and extending between a first pair of cam follower surfaces in a first direction away from said first axis, said protrusion extending into said first channel and between said first pair of cam follower surfaces, said actuator being movable in an axial direction in response to rotation of said cam about said second axis; and a second channel formed in said cam follower, said second channel being generally perpendicular to said first axis and extending between a second pair of cam follower surfaces in a second direction away from said second axis, said second direction being opposite and parallel to said first direction, said protrusion being alternatively disposable into said first and second channels and between said first and second pairs of cam follower surfaces.

11. The shift mechanism of claim 10, wherein:
said output shaft is a propeller shaft.

12. The shift mechanism of claim 11, further comprising:
a second drive gear which is rotatable about said first axis and rotatable relative to said output shaft, said clutch member being alternately movable relative to said output shaft in a direction parallel to said first axis and into driving relation with said first and second drive gears.

13. The shift mechanism of claim 12, wherein:
said marine propulsion system is an outboard motor.

14. The shift mechanism of claim 12, wherein:
said clutch member is movable relative to said output shaft in a direction parallel to said first axis in response to rotation of said cam about said second axis.

15. The shift mechanism of claim 10, wherein:
said protrusion comprising a generally spherical cam surface.

16. A shift mechanism for a marine propulsion system, comprising:
an output shaft rotatable about a first axis;
a first drive gear which is rotatable about said first axis and rotatable relative to said output shaft;
a clutch member which is rotatable with said output shaft about said first axis, said clutch member being movable relative to said output shaft in a direction parallel to said first axis;
an actuator attached to said clutch member for axial and rotational movement in synchrony with said clutch member;
a cam which is rotatable about a second axis, said cam being shaped to have a protrusion extending in a direction away from said second axis, said cam having a cam surface proximate a distal end of said protrusion;
a cam follower rotatably attached to said actuator for movement in synchrony with said actuator in a direction which is generally parallel to said first axis;
a first channel formed in said cam follower, said first channel being generally perpendicular to said first axis and extending between a first pair of cam follower surfaces in a first direction away from said first axis, said protrusion extending into said first channel and between said first pair of cam follower surfaces, said actuator being movable in an axial direction in response to rotation of said cam about said second axis;
a second channel formed in said cam follower, said second channel being generally perpendicular to said first axis and extending between a second pair of cam follower surfaces in a second direction away from said second axis, said second direction being opposite and parallel to said first direction, said protrusion being alternatively disposable into said first and second channels and between said first and second pairs of cam follower surfaces; and
a second drive gear which is rotatable about said first axis and rotatable relative to said output shaft, said clutch member being alternately movable relative to said output shaft in a direction parallel to said first axis and into driving relation with said first and second drive gears.

17. The shift mechanism of claim 16, wherein:
said output shaft is a propeller shaft.

18. The shift mechanism of claim 17, wherein:
said marine propulsion system is an outboard motor.

19. The shift mechanism of claim 18, wherein:
said clutch member is movable relative to said output shaft in a direction parallel to said first axis in response to rotation of said cam about said second axis.

* * * * *